United States Patent [19]

Danna et al.

[11] 4,011,981
[45] Mar. 15, 1977

[54] PROCESS FOR BONDING TITANIUM, TANTALUM, AND ALLOYS THEREOF

[75] Inventors: Peter A. Danna, Milford, Conn.; Richard A. Holcomb, Lake Charles, La.; Richard J. Roethlein, Stafford Springs, Conn.

[73] Assignee: Olin Corporation, New Haven, Conn.

[22] Filed: Mar. 27, 1975

[21] Appl. No.: 562,729

[52] U.S. Cl. .............................. 228/208; 228/263
[51] Int. Cl.$^2$ ........................................ B23K 1/20
[58] Field of Search ............ 204/37; 228/208, 209, 228/210, 263

[56] References Cited

UNITED STATES PATENTS

| | | | |
|---|---|---|---|
| 3,006,069 | 10/1967 | Rhoads et al. | 228/263 X |
| 3,107,756 | 10/1963 | Gallet | 228/263 X |
| 3,339,267 | 9/1967 | Bronnes et al. | 228/208 X |
| 3,393,446 | 7/1968 | Hughes et al. | 228/208 |
| 3,497,425 | 2/1970 | Cotton et al. | 204/37 X |
| 3,862,488 | 1/1975 | Pessell et al. | 228/208 |

*Primary Examiner*—Al Lawrence Smith
*Assistant Examiner*—K. J. Ramsey
*Attorney, Agent, or Firm*—James B. Haglind; Donald F. Clements; Thomas P. O'Day

[57] ABSTRACT

A method of bonding film-forming metals and their alloys has been developed. The method comprises applying a first coating of a metal, compound, or alloy of the platinum metal group to the film-forming metal. A second coating of copper is then applied to the first coating. A second metal, such as steel, can then be readily soldered to the copper coating to form a strong, durable bond.

This bonding method can be used, for example, to solder a titanium screen or mesh to an electroconductive metal in the assembly of electrolytic cells for the production of chlorine or oxychlorine compounds.

23 Claims, No Drawings

PROCESS FOR BONDING TITANIUM, TANTALUM, AND ALLOYS THEREOF

This invention relates to a novel process for bonding film-forming metals and alloys thereof.

Film-forming metals are those which readily form an oxide layer on their outer surface. It is known in the prior art to join film-forming metals such as titanium or tantalum to other metals, for example, by depositing a copper coating on the titanium or tantalum before bonding. However, the bond is not suitable unless the oxide layer is removed from the titanium or tantalum member prior to depositing the copper coating.

The oxide-removal treatment is time-consuming and often is not feasible where the film-forming member is to be assembled in the field.

In addition, temperatures of at least 570° F. are required to form a titanium-copper bond, see for example, U.S. Pat. No. 2,992,135, July 11, 1961, issued to Finlay or U.S. Pat. No. 3,106,773, Oct. 15, 1963, issued to Jaffe et al.

Also known in the prior art is the coating of film-forming metals such as titanium or tantalum with platinum group metals or compounds to form materials which are corrosion-resistant materials and are suitable for use as electrodes in electrolytic processes. These platinum coated materials cannot be readily joined by soldering as solders do not readily adhere to the platinum metal. U.S. Pat. No. 3,497,425, Feb. 24, 1970, issued to Cotton et al describes a process for preparing a titanium-based electrode by coating the titanium with a platinum group metal, applying a second coating of copper to the platinum group metal, heating the coated titanium to at least 570° F. to diffuse the coating and subsequently dissolving out the copper.

There is, however, no teaching in the prior art of a method of bonding a film-forming metal to a second metal employing standard soldering techniques at low to moderate temperatures.

It is therefore desirable to provide a process whereby film-forming metals or alloys thereof can be readily bonded using, for example, standard soldering techniques without removing the oxide layer formed on the film-forming metal.

It is an object of the present invention to provide a process for bonding film-forming metals or their alloys.

It is an additional object of the present invention to provide a process for bonding film-forming metals using standard soldering techniques at low to moderate temperatures.

It is a further object of the present invention to provide a process for bonding film-forming metals and their alloys where it is unnecessary to remove the film or oxide layer prior to bonding.

These and other objects of the invention will be apparent from the following detailed description of the invention.

It has now been found that the foregoing objects are accomplished in a novel process for bonding a first film-forming metal to a second metal which comprises applying a first coating of a platinum group component. The platinum group component is selected from the group consisting of platinum group metals, platinum group metal compounds, and mixtures thereof. To this first coating is applied a second coating of copper. A second metal is then soldered to the second coating of copper to bond the second metal to the first film-forming metal.

More in detail, the film-forming metals used in the process of the present invention include titanium, tantalum, zirconium, niobium, and tungsten and alloys thereof. The alloys used may be any suitable alloys including, for example, alloys with other film-forming metals. Suitable examples include titanium containing up to 14 percent of zirconium, alloys of titanium or tantalum containing up to 5 percent of a platinum metal such as platinum, rhodium, or iridium, or for example, alloys of titanium or tantalum containing niobium or tungsten.

While any of the above listed film-forming metals may be used in the process of the present invention, titanium and tantalum are preferred embodiments.

If desired, a coating of a film-forming metal compound such as an oxide or hydride may be applied to the film-forming metal prior to applying the coating of the platinum metal component. For example, a layer of titanium dioxide or titanium hydride may be produced on a titanium member and the platinum metal component applied to the titanium compound layer.

To these film-forming metals is applied a first coating of a platinum group component including one or more platinum group metals, i.e. platinum, rhodium, iridium, ruthenium, osmium, and palladium.

In addition to coatings containing a single platinum metal, mixtures of platinum metals may be used, for example, platinum and iridium, or ruthenium and palladium and the like. Platinum, iridium and ruthenium are preferred platinum group metals to be employed in the platinum metal coating.

Also suitably used in preparing the platinum metal coating are platinum metal compounds such as the carbides, silicides, oxides, nitrides, borides, phosphides, halides, and aluminides of the platinum metals defined above.

These platinum metal compounds may be used singularly or, for example, in mixtures, i.e. platinum nitride with ruthenium boride, osmium carbide and palladium silicide, platinum oxide and ruthenium dioxide. Because of the convenience of preparation, platinum metal oxides are preferred platinum metal compounds, for example, platinum oxides or ruthenium oxides.

The coating of the platinum group component may be applied by any of the methods known to the prior art, for example, by electrodeposition, or by the thermal decomposition of a chemical compound containing the platinum metal group component. Particularly suitable for the application of the platinum metal coating are methods which employ a platinum group metal compound contained in an organic solvent where the solution is painted on the film-forming metal member and subsequently heated to form a coating of the platinum group metal, the platinum group metal compound, or mixtures thereof. For example, U.S. Pat. No. 3,234,110, Feb. 8, 1966, issued to Beer, describes the preparation of coatings of the platinum group metals or mixtures of platinum group metals. A platinum group metal halide compound such as platinum tetraiodide or iridium tetrachloride or a mixture thereof is contained in an organic solvent such as ethanol. The solution is painted onto the film-forming metal member and the metal member is heated in air at a temperature of about 480° F. for 11 minutes to evaporate and burn off the solvent. The painting and heating steps may be repeated until a coating having the desired thickness is obtained. Similarly, U.S. Pat. No. 3,663,280, May 16, 1972, issued to Lee, describes a process for applying a coating of a platinum metal group compound such as the oxide by painting a platinum group metal halide such as ruthenium chloride onto a titanium member and subsequently heating the member to oxidize the ruthenium to ruthenium dioxide. Any suitable thickness of platinum metal coating may be applied to the film-forming metal member. For example, a coating containing from about 1 to about 30 and preferably from about 3 to about 20 grams of the platinum metal component per square meter of the film-forming metal may be used.

Following the application of the platinum metal coating, a coating of copper is deposited on the platinum metal coating. Suitable methods of applying the copper to the platinum metal may be any of those known to the prior art such as electrodeposition or chemical coating. The copper coating may be applied in any desirable thickness such as a coating, for example, having a thickness of from about $2.5 \times 10^3$ to about $1 \times 10^7$ and preferably from about $2.5 \times 10^4$ to about $5 \times 10^5$ Angstroms.

To complete the bonding process, a second metal is joined to the copper coating on the film-forming member. This second metal may be any metal which can suitably be joined with copper, for example, steel, copper, lead, tin, silver, brass, stainless steel, cadmium, or a platinum group metal. The second metal is soldered to the copper coating. To avoid damaging or altering the platinum metal coating, it is preferred to solder the second metal to the copper coating at low to moderate temperatures, that is at "soft-solder" temperatures. These temperatures range at from about 350° to about 550° F., and preferably from about 375° to about 525° F.

Where the platinum metal coating is composed of, for example, platinum metal or a mixture of platinum and iridium metals, soldering temperatures are selected from the lower portion of the temperature range to avoid undesired oxidation of the platinum metals.

The solders employed may be any of those which melt in the soft solder range as defined above, and which are compatible with Cu and the second metal. Suitable solders include those of tin and silver, tin and lead, or tin, lead and antimony.

Standard soldering procedures are employed in which, for example, a flux such as a liquid flux is brushed on the surface of the second metal which is to be joined to the copper coating on the film-forming metal member. The film-forming metal member or both metal members are heated to the temperature required to melt the solder. The second metal is then bonded to the copper coating and the joint completed. It is unnecessary to employ special conditions such as an inert atmosphere to carry out the process of the present invention.

Degreasing the metal members to be bonded may be carried out, if desired, by any of the commonly known procedures, for example, by washing the metal members with a solvent such as acetone.

The novel bonding process of the present invention enables a film-forming metal to be joined to a second metal without removal of the film or oxide layer. The novel process permits the bonding to be conducted at low to moderate temperatures using standard soldering techniques.

The following examples are presented to illustrate the novel bonding process more fully. All parts and percentages are by weight unless otherwise specified.

EXAMPLE I

An anode composed of a titanium plate having a coating of a platinum-iridium alloy was to be bonded to a steel support plate for the anodes. The coating employed 10 grams of the platinum-iridium alloy per square meter of surface of the titanium plate. A portion of the plate was degreased by rinsing with acetone and then inserted as the cathode between two copper anodes in a copper plating bath having the following composition:

|  | Grams/liter |
| --- | --- |
| $CuSO_4$ | 210.00 |
| $H_2SO_4$ | 60.00 |
| Thiourea | 0.01 |
| Dextrin | 0.01 |
| HCl | 0.01 |

A current of 30 milliamps/cm$^2$ was applied for 26 minutes to deposit a copper coating on the portion treated having a thickness of about $1.7 \times 10^5$ Angstroms. The copper-coated portion of the titanium plate and a groove in the steel plate were acid washed. Liquid flux was brushed in the groove and two strips of solder were placed in the groove in the steel plate. The solder was composed of 96.5 percent Sn and 3.5 percent Ag and was purchased from the Unibraze Corporation under the trade name "Unibraze Sil-Bright 415". The titanium electrode and the steel plate were then heated to about 518° F. and the titanium plate set in the groove in the steel plate. The joint was brushed with flux and solder was added as needed. There was no indication of a failure of the joint when the anode assembly was subsequently employed in an electrolytic cell for the electrolysis of sodium chloride brine.

EXAMPLE II

The method of Example I was repeated using a titanium anode having a coating of titanium dioxide beneath a coating of ruthenium dioxide containing 10 grams of RuO$_2$ per square meter of titanium surface. A copper coating was electrodeposited on a portion of the ruthenium dioxide coating employing the plating bath of Example I. A current of 30 milliamps/cm$^2$ was applied for 27 minutes. A copper coating having a thickness of about $1.8 \times 10^5$ Angstroms was deposited on the ruthenium oxide coating. The copper-coated portion of the titanium anode was subsequently soldered to a steel plate using the process of Example I.

I claim:

1. A process for bonding a first film-forming metal selected from the group consisting of titanium, tantalum, zirconium, niobium, tungsten and alloys thereof to a second metal which comprises:
    a. applying a first coating of a platinum metal component selected from the group consisting of platinum group metals, platinum group metal compounds, and mixtures thereof to said first film-forming metal,
    b. applying a second coating of copper to said first coating, and
    c. soldering said second metal to said second coating of copper on said first film-forming metal.

2. The process of claim 1 in which said platinum group metal is selected from the group consisting of platinum, rhodium, iridium, ruthenium, osmium, and palladium, and mixtures thereof.

3. The process of claim 1 in which said platinum metal component is a platinum metal compound selected from the group consisting of carbides, silicides, oxides, nitrides, borides, phosphides, halides, aluminides, and mixtures thereof.

4. The process of claim 3 in which said platinum metal compounds are oxides, or mixtures thereof.

5. The process of claim 1 in which said second metal is selected from the group consisting of steel, copper, lead, tin, silver, brass, stainless steel, cadmium, and a platinum group metal.

6. The process of claim 5 in which said second metal is selected from the group consisting of steel, copper, silver, and stainless steel.

7. The process of claim 6 in which said first film-forming metal is selected from the group consisting of titanium, titanium alloys, tantalum, and tantalum alloys.

8. The process of claim 7 in which the soldering of said second metal to said second coating of copper is conducted in the temperature range of from about 350° to about 550° F.

9. The process of claim 8 in which said platinum group metal is selected from the group consisting of platinum, iridium, ruthenium, and mixtures thereof.

10. The process of claim 9 in which said first film-forming metal is titanium and said platinum group metal is a mixture of platinum and iridium.

11. The process of claim 7 in which said first film-forming metal is titanium having an oxide layer applied prior to applying said first coating.

12. A process for bonding a first film-forming metal selected from the group consisting of titanium, tantalum, zirconium, niobium, tungsten and alloys thereof having a first coating selected from the group consisting of platinum group metals, platinum group metal compounds, and mixtures thereof to a second metal which comprises:
   a. applying a second coating of copper to said first coating, and
   b. soldering said second metal to said second coating of copper on said first film-forming metal at a temperature of from about 350° to about 550° F.

13. The process of claim 12 in which said first coating is a platinum group metal compound selected from the group consisting of carbides, silicides, oxides, nitrides, borides, phosphides, halides, aluminides, and mixtures thereof.

14. The process of claim 13 in which said platinum group metal compounds are oxides or mixtures thereof.

15. The process of claim 14 in which said platinum group metal oxides are ruthenium oxides.

16. The process of claim 15 in which said first film-forming metal is titanium.

17. The process of claim 12 in which said platinum group metal is selected from the group consisting of platinum, rhodium, iridium, ruthenium, osmium, palladium, and mixtures thereof.

18. The process of claim 12 in which said second metal is selected from the group consisting of steel, copper, a platinum group metal, silver, tin, lead, brass, cadmium, and stainless steel.

19. The process of claim 18 in which said second metal is selected from the group consisting of steel, copper, silver, and stainless steel.

20. The process of claim 19 in which said soldering is conducted at a temperature of from about 375° to about 525° F.

21. The process of claim 20 in which said platinum group metal is selected from the group consisting of platinum, iridium, and ruthenium, and mixtures thereof.

22. The process of claim 21 in which said platinum group metal is a mixture of platinum and iridium.

23. The process of claim 12 in which said first film-forming metal is selected from the group consisting of titanium, titanium alloys, tantalum and tantalum alloys.

* * * * *